United States Patent [19]

Farahati et al.

[11] Patent Number: 5,081,652
[45] Date of Patent: Jan. 14, 1992

[54] OFFSET CORRECTION

[75] Inventors: Nader Farahati, Cambridge; Samuel Ng, Camberley, both of England

[73] Assignee: Technophone Ltd., Surrey, England

[21] Appl. No.: 505,016

[22] Filed: Apr. 4, 1990

[30] Foreign Application Priority Data

May 31, 1989 [GB] United Kingdom ............... 8912435

[51] Int. Cl.$^5$ ............................................. H04L 27/06
[52] U.S. Cl. ................................... 375/97; 455/256; 329/306
[58] Field of Search ............... 375/82, 96, 97, 119, 375/120; 435/256, 257, 258; 329/306, 307, 308; 328/155

[56] References Cited

U.S. PATENT DOCUMENTS

| | | | |
|---|---|---|---|
| 4,485,477 | 11/1984 | Nossen | 375/97 |
| 4,514,855 | 4/1985 | Lang | 328/155 |
| 4,669,094 | 5/1987 | Van Rumpt | 375/97 |
| 4,691,377 | 9/1987 | Yoshihara et al. | 455/256 |
| 4,879,728 | 11/1989 | Tarallo | 329/306 |
| 4,896,336 | 1/1990 | Henely et al. | 329/308 |

FOREIGN PATENT DOCUMENTS

0143469A2 6/1985 European Pat. Off. .
2034158A 5/1980 United Kingdom .

Primary Examiner—Stephen Chin
Attorney, Agent, or Firm—Perman & Green

[57] ABSTRACT

A radio receiver includes apparatus for correcting phase and frequency offsets in a digitally modulated carrier signal. The receiver includes processing circuitry which outputs a baseband signal at point. The circuitry includes a local oscillator generating a signal intended to have a phase and frequency related (e.g. substantially equal) to the carrier signal. The baseband signal from the circuitry is input to a demodulator which generates a signal in the form of a sequence of digits corresponding to the original carrier signal. The baseband signal is sampled by a sampler and the demodulated signal is sampled by a sampler. Processing circuitry calculates the correlation function of the two sample signals and determines the value of the phase $\Phi_x$ at a time when the correlation function is a maximum. A control signal $V_c$ indicative of the phase $\Phi_x$ is generated by a signal generator and applied to the oscillator whereby the phase of the oscillator output signal is adjusted by an amount corresponding to the phase offset. Preferably, sampling is effected on at least two occasions. The phase differences determined on each correlation are subtractively combined and the resultant phase value is divided by the time interval between the peaks of the two associated correlation functions to derive a value for the offset frequency. A control signal indicative of the frequency offset is then fed to the oscillator means to modify the oscillator output frequency accordingly.

11 Claims, 1 Drawing Sheet

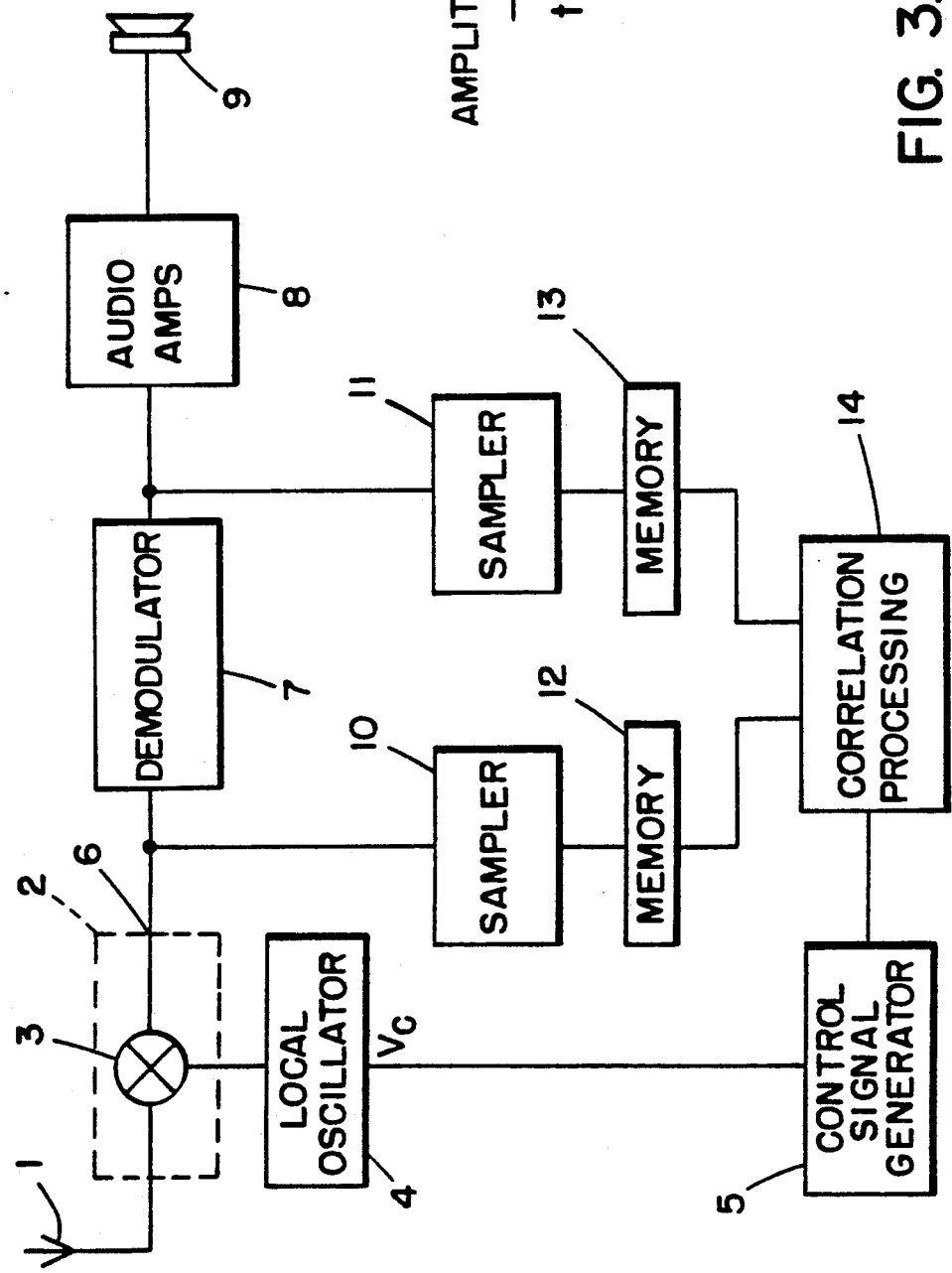

OFFSET CORRECTION

This invention relates to a method and apparatus for recovering the carrier signal from a digitally modulated carrier signal, and more especially for correcting offsets suffered as a result of the transmission and reception processes in digital communication by radio.

BACKGROUND OF THE INVENTION

In order to be able to transmit a digital signal, i.e. a stream of bits, via the medium of radio it is necessary to represent the bit stream as an analogue (continuous-time) signal. This involves the process of modulation. A technique commonly used for this purpose is passband pulse amplitude modulation (PAM) in which, in general, two sinusoidal carriers of the same frequency, but with a ninety degree phase difference, are modulated by the real and imaginary parts of a complex-valued baseband signal. The transmitter includes a coder which converts the incoming bits into so-called symbols, i.e. groups of bits which collectively constitute an alphabet.

At the receiver a demodulator is used to extract the discrete-time information from the continuous-time modulated signal. The demodulator incorporates a so-called slicer or decision device which applies a series of decision thresholds to generate an estimate of the transmitted symbols and so reconstruct the original bit stream.

The carrier frequency is generated in the transmitter from a local timing reference such as a crystal oscillator. Coherent demodulation of a passband signal in the receiver requires exactly the same carrier frequency and phase to perform the demodulation, but the receiver usually has an independent timing reference.

In practice the continuous-time signal received at the demodulator will have been corrupted by the channel (which includes the effects of modulation, the transmission medium, and the receiver). One effect of this corruption will manifest itself as a phase and/or frequency offset, that is to say the phase and/or frequency of the demodulated signal may be shifted relative to the original data signal at the transmitter end.

In order to reduce offset it is possible to use a very stable local oscillator such as an oven crystal, but these are very costly and relatively bulky and furthermore do not compensate for offset due to other elements in the channel.

One technique for determining overall phase offset is to employ a transmitter simulator in the receiver and to use the detected symbols emanating from the demodulator to create an estimate of the ideal phase trajectory (only available at the real transmitter) and to compare this with the measured phase trajectory in the receiver. The difference between the two trajectories represents the phase error. The disadvantage of this technique is that it requires substantial amounts of computation and associated hardware.

In the book entitled "Digital Communication" by Lee and Messerschmitt, published by Kluwer Academic Publishers at pages 549-554, there is proposed a technique which can track phase and frequency offset, in which individual detected symbols emanating from the demodulator are used to determine the phase error.

SUMMARY OF THE INVENTION

According to a first aspect of the present invention there is provided apparatus for recovering the carrier signal from a digitally modulated carrier signal, comprising means for receiving the modulated carrier signal, means coupled to said receiving means for processing the modulated carrier signal to output a modified signal, said processing means including oscillator means for generating a signal nominally having a predetermined phase and frequency relationship relative to the carrier signal, means coupled to the processing means for demodulating said modified signal to generate a demodulated signal in the form of a sequence of digits corresponding to the carrier signal, means for deriving a sample of the modified signal, means for deriving a sample of the demodulated signal, means for calculating at least part of the correlation function of the modified signal sample and the demodulated signal sample, means responsive to the calculating means for generating a control signal, and means for applying the control signal to the output means whereby the phase of the signal generated by the oscillator means is adjusted in accordance with said control signal substantially to maintain the predetermined relationship between the phase of the signal generated by the oscillator means and the carrier signal.

This carrier recovery apparatus has the advantage that it can track the carrier signal very accurately using a relatively inferior, less stable oscillator avoiding the need for more sophisticated oscillators which are not only expensive, but also relatively bulky. The present apparatus can therefore be relatively compact and lightweight and is ideally suited for application in a portable radio receiver such as a handportable cellular telephone.

Suitably, means are included for determining the value of the phase $\phi x$ of the received signal at a time tx when the correlation function is a maximum, the control signal generating means being adapted to generate a control signal indicative of the phase value $\Phi x$ at the time tx.

Preferably, sampling is effected on at least two occasions. The phase differences determined on each comparison are subtractively combined and the resultant phase value is divided by the time interval between the peaks of the two associated correlation functions to derive a value for the offset frequency. A control signal indicative of the frequency offset is then fed to the oscillator means to modify the oscillator output frequency accordingly.

In the case where it is desired to receive time division multiplexed signals, which are transmitted in bursts of known duration, the overall time span in which the two samples are taken (including the time interval between the samples) is less than, or at most equal to, the duration of the transmitted signal burst.

In a preferred embodiment sampling is carried out repeatedly and the results of phase and frequency offsets are averaged on a cumulative basis which enables the effect of noise to be cancelled out. Hence, apparatus in accordance with the invention employs information contained in a plurality of symbols rather than individual symbols as in the Lee and Messerschmitt technique mentioned above. The correlation of the two signal samples has the advantage that it creates a smoothing effect and consequently offers better noise immunity.

According to a further aspect of the present invention there is provided a method for recovering the carrier signal from a digitally modulated carrier signal, including the steps of receiving the modulated carrier signal, processing the received carrier signal to output a modified signal, said processing step employing oscillator means for generating a signal nominally having a predetermined phase and frequency relationship relative to the carrier signal, demodulating said modified signal to generate a demodulated signal in the form of a sequence of digits corresponding to the carrier signal, deriving a sample of the modified signal, deriving a sample of the demodulated signal, calculating the correlation function of the modified signal sample and the demodulated signal sample, generating a control signal in accordance with information derived from the correlation function, and applying the control signal to the output means whereby the phase of the signal generated by the oscillator means is adjusted in accordance with said control signal substantially to maintain the predetermined relationship between the phase of the signal generated by the oscillator means and the carrier signal.

BRIEF DESCRIPTION OF THE FIGURES

An embodiment of the invention will now be described, by way of example, with reference to the accompanying drawings, in which:

FIG. 1 is a schematic diagram showing schematically a radio receiver comprising carrier recovery apparatus in accordance with the present invention, FIG. 2 is a plot showing the results of correlating two signal samples over a sampling period, and FIG. 3 shows the manner in which decisions are made in the demodulator of the receiver in FIG. 1.

DESCRIPTION OF A PREFERRED EMBODIMENT OF THE INVENTION

The receiver shown schematically in FIG. 1 is intended for receiving digitally modulated carrier signals transmitted from a remote transmitter via the radio medium. The signal typically will be of the PAM-type in which the data bit stream has been converted to a set of symbols by a coder at the transmitter end. In the present embodiment, the set of dibits {00,01,10,11} are mapped into complex valued symbols $\{-1+j,1+j3,1-j,-1-j\}$ as shown In FIG. 3.

The receiver comprises an antenna 1 for receiving the transmitted modulated signal, coupled to conventional processing circuitry 2. As shown, the processing circuitry comprises a mixer to which is coupled not only the antenna 1, but also a local oscillator 4 which generates a signal whose phase and frequency are intended to correspond to the phase and frequency of the carrier signal. The local oscillator 4 is coupled to a control signal generator 5 which delivers a control signal $V_c$ to the local oscillator in order to vary the phase and/or frequency of the oscillator output signal, i.e. the signal applied to the mixer 3. The mixer combines the incoming modulated carrier signal with the oscillator output signal in known manner to generate a modified signal. The modified signal emanating directly from the mixer 3 will be an intermediate frequency (IF) signal. However, as is usual, the receiver processing circuitry 2 will include further mixing stages (not shown) and the ultimate output signal at point 6 in FIG. 1 will be a baseband signal.

The processing circuitry 2 is coupled to the input of a demodulator 7 which acts to reconstitute the original digital signal at the transmitter. The demodulator 7 may comprise an equalizer (not shown) which is effective to compensate for intersymbol interference (ISI) as is well-known in the art, including a so-called "decision device" or "slicer", itself again well known in the art, which applies a series of decision thresholds to arrive at an estimate of the transmitted data symbol. FIG. 3 shows the constellation and decision regions for the four symbol alphabet example under consideration, namely the symbols corresponding to dibits {00,01,10,11} which are represented as crosses at the four points of a symmetrical X-shape. Because of additive noise, the received samples at the input to the slicer will not correspond exactly to points in the signal constellation. The orthogonal solid lines represent the decision regions so that if a detected symbol falls in quadrant A the slicer decides that the transmitted symbol is 01. Likewise, a detected symbol falling in quadrant B is interpreted as 10, a symbol in quadrant C is assumed to be 11, and a symbol in quadrant D is estimated as 00. Hence, as mentioned previously, the decision device within the demodulator 7 generates at its output an estimate of the transmitted symbols. In the present case where the transmitted baseband signal is assumed to represent a speech waveform, the demodulator 7 is in turn coupled to conventional signal converters and audio amplifiers 8 and thence to a loudspeaker 9.

In accordance with the present invention two sampling devices 10 and 11 are incorporated in the receiver. Sampler 10 is disposed prior to the demodulator for deriving a digitized sample of the baseband (waveform) signal emanating from the processing circuitry 2, i.e. immediately prior to the demodulator 7, whereas the sampler 11 is disposed immediately after the demodulator 7 for sampling the bit stream emanating therefrom.

The sampling window for both samplers 10 and 11 is of the same width. In practical experiments the applicants have used a sampling window of 15 bits extending over a time period of 50 microseconds. The output of sampler 10 is stored in a memory 12 and the output of sampler 11 is similarly stored in a memory 13. The memories 12 and 13 are each coupled to a correlation processing device 14 incorporating a correlator comprising a multiplier and adder for calculating the correlation function of the two signal samples stored in memories 12 and 13. Correlators are themselves well known in the art. The correlation function is a measure of the average product of a signal and its time-shifted version and more particularly is a summation of the individual products of the respective symbols of the modified signal entering the demodulator 7 and the estimated symbols emanating from the demodulator. Now it is well-known that the autocorrelation function of any random sequence approaches a delta function as the length of the sequence is allowed to increase. In the present case the cross-correlation of the signal sampled by sampler 10 with the signal sampled by sampler 11 over a finite time interval results in a curve A, see FIG. 2, which approximates to a delta function and has a pronounced maximum at a time $t_x$. However, the signals sampled by the samplers 10 and 11 are complex values conveying both amplitude and phase information. The phase angle is given by the arctangent of the quotient of the imaginary and real parts of the complex value, i.e. $\tan^{-1}(Re/Im)$. The phase information yields a plot B, see FIG. 2, showing the variation of phase (on the vertical axis) with time (on the horizontal axis). It is noted that the plot B may not be strictly linear in practice.

It is also noted that if the sampled signals have already been synchronized as a result of other processing in the receiver, e.g. in the determination of the channel impulse response, the sampler 11 can be arranged to sample exactly the corresponding portion of the signal which has been sampled by the sampler 10. In this case it is not necessary to determine the full correlation function, but merely to establish the maximum magnitude, i.e. at the time $t_x$. This magnitude is determined by summing the individual products of the respective symbols of the two sampled signals at the corresponding sampling times without taking into account the time shifted version of either signal. Clearly this dramatically reduces the amount of computation required. Furthermore, the magnitude of the correlation function at the time $t_x$ is a direct indication of the reliability of the result obtained, i.e. the higher the value the greater is the reliability. Since the signals are complex valued the magnitude is determined by the square root of the sum of the squares of the real and the imaginary parts of the complex value. However, since only relative magnitudes are being considered, the square root can be ignored, in which case the magnitude can be represented by the expression $(Re^2 + Im^2)$.

The processing portion of the device 14 determines the value of the phase $\Phi_x$ at the time $t_x$ at which the correlation function is a maximum and conveys this information to control signal generator 5 which in turn generates a control signal $V_c$ indicative of the phase value $\Phi_x$. The phase value $\Phi_x$ represents the overall phase offset in the system, namely the sum of the phase offset of the local oscillator relative to the transmitted carrier before passing through the channel plus the phase offset due to the channel itself. The signal from the local oscillator 4 is adjusted in accordance with the control signal $V_c$ to vary the output signal, specifically to apply a correction corresponding to the phase value $\Phi_x$. Thus the local oscillator can closely track the phase of the transmitted carrier signal.

Even if the operation of the receiver is not affected by phase offset, excessive frequency offset can adversely influence the performance of the receiver and in this case it is not so important to drive down the phase difference of the carrier and the local oscillator, but to minimise the frequency offset between them.

Preferably, therefore, the samplers 10 and 11 are arranged to sample the respective signals at the input and output ends of the demodulator 7 periodically. For example, the interval between two successive sampling windows may be 1.6 ms. This enables the frequency offset to be calculated. To this end the correlation and processing device 14 determines the value of phase $\Phi_1$ at which the correlation of the first pair of samples from samplers 10 and 11 respectively is a maximum, and the value of the phase $\Phi_2$ at which the correlation function of the second pair of samples from samplers 10 and 11 respectively is a maximum. The processing portion then determines the value of $(\Phi_2 - \Phi_1)/\Delta t$, where $\Delta t$ is the time interval $t_2 - 0365\ t_1$ and $t_2$ is the time value at which the correlation function of the first sample pair is a maximum, and $t_1$ is the value at which the correlation function of the second sample pair is a maximum.

Furthermore, repeated periodic sampling enables the offset correction to be applied at frequent intervals and so the carrier signal is tracked accurately on a continuing basis. Also, the present phase and frequency offset measurements can be averaged with the historical values on a cumulative basis which has the effect of cancelling out the effects of noise.

Apparatus in accordance with the invention permits the local oscillator to track the carrier frequency with such accuracy that it is well suited for use in systems which impose stringent tracking requirements. For example, the Pan-European Digital Mobile Communication System currently proposed by GSM requires the mobile station to track the carrier frequency with an accuracy of up to 0.1 ppm. This requirement can readily be met by the present carrier recovery apparatus. In practice the applicants have found that an accuracy of better than plus or minus 50 Hz can be achieved with a carrier frequency of 900 MHz.

A normal GSM radio burst would consist of two segments of data each 58 bits long separated by a known mid-amble which is 26 bits long, the duration of the whole burst being 0.57 ms. The mid-amble is ideal for sampling in accordance with the present invention. Using known data means that less error occurs at the decision stage, hence permitting greater accuracy in the estimation of the original digital signal. However, since the GSM system employs time division multiplexing the receiver would only receive one burst every 4.6 ms and therefore, under high frequency offset conditions, more than $\pi$ radians of phase change may have occurred between successive receptions resulting in offset estimation ambiguity. However, this problem can be overcome using the apparatus in accordance with the present invention by sampling and correlating the pre-demodulator signal and the decision directed bit stream (post-demodulator) signal to measure the phases at both the beginning and end of the burst. From the phase change spanning the length of a burst, the frequency offset can be calculated. Hence, the apparatus in accordance with the invention may be used for either high or low frequency offset measurements.

In view of the foregoing description it will be evident to a person skilled in the art that various modifications may be made within the scope of the invention, specifically with respect to the length and frequency of sampling and to the manner in which the conventional features of the receiver are actually implemented. Furthermore, the invention is not restricted to conveying speech waveforms, but may also find application in other wireless communications systems, for example for communicating with a computer using the medium of radio to transmit digital data intended to be processed directly by the computer.

We claim:

1. Apparatus for recovering the carrier signal from a digitally modulated carrier signal, comprising means for receiving the modulated carrier signal, means coupled to said receiving means for processing the modulated carrier signal to output a modified signal, said processing means including oscillator means for generating a signal nominally having a predetermined phase and frequency relationship relative to the carrier signal, means coupled to the processing means for demodulating said modified signal to generate a demodulated signal in the form of a sequence of digits corresponding to the carrier signal, means for deriving a sample of the modified signal, means for deriving a sample of the demodulated signal, means for calculating at least part of the correlation function of the modified signal sample and the demodulated signal sample, means responsive to the calculating means for generating a control signal, and means for applying the control signal to the oscillator means whereby the phase of the signal generated by the oscillator means is adjusted in accordance with said control signal substantially to maintain the predetermined relationship between the phase of the signal generated by the oscillator means and the carrier signal.

2. Apparatus as claimed in claim 1, including first memory means coupled between the means for deriving a sample of the modified signal and the calculating means for storing the modified signal sample, and second memory means coupled between the means for deriving a sample of the demodulated signal and the calculating means for storing the demodulated signal sample.

3. Apparatus as claimed in claim 1, including means for determining the value of the phase $\Phi_x$ at a time tx when the correlation function is a maximum, wherein the control signal generating means are adapted to generate a control signal indicative of the phase value $\Phi_x$ at the time tx.

4. Apparatus as claimed in claim 1, wherein the modified signal sampling means is arranged to derive first and second samples of the modified signal, and the demodulated signal sampling means is arranged to derive corresponding first and second samples of the demodulated signal, the calculating means being arranged to derive a first correlation function for the first signal samples of the modified signal and the demodulated signal respectively, including means responsive to the first and second correlation functions for generating a control signal indicative of the frequency offset of the modulated carrier signal, and means for applying the frequency offset-indicative control signal to the oscillator means whereby the frequency of the signal generated thereby is adjusted substantially to maintain the predetermined relationship between the frequency of the signal generated by the oscillator means and the carrier signal.

5. Apparatus as claimed in claim 4, adapted to receive time division multiplexed signals transmitted in bursts, wherein the overall time span during which the first and second signal samples are derived including the time interval therebetween is not longer than the duration of the transmitted signal burst.

6. Apparatus as claimed in claim 4 or claim 5, including means for deriving the value of phase $\Phi_1$, at a time $t_1$, when the first correlation function is a maximum and for deriving the value of phase $\Phi_2$ at a time $t_2$ when the second correlation function is a maximum, means for subtracting the phase values $\Phi_2$ and $\Phi_1$, means for determining the time interval $\Delta t$ to determine the frequency offset value.

7. Apparatus as claimed in claim 1, claim 3 or claim 4 including means for determining the average of the phase or frequency offset values on a cumulative basis, the generated control signal being indicative of the current averaged value of the phase or frequency offset.

8. A radio receiver for recovering the carrier signal from a digitally modulated carrier signal, comprising means for receiving the modulated carrier signal, means coupled to said receiving means for processing the modulated carrier signal to output a modified signal, said processing means including oscillator means for generating a signal nominally having a predetermined phase and frequency relationship relative to the carrier signal, means coupled to the processing means for demodulating said modified signal to generate a demodulated signal in the form of a sequence of digits corresponding to the carrier signal, means for deriving a sample of the modified signal, means for deriving a sample of the demodulated signal, means for calculating at least part of the correlation function of the modified signal sample and the demodulated signal sample, means responsive to the calculating means for generating a control signal, and means for applying the control signal to the oscillator means whereby the phase of the signal generated by the oscillator means is adjusted in accordance with said control signal substantially to maintain the predetermined relationship between the phase of the signal generated by the oscillator means and the carrier signal.

9. A radio receiver as claimed in claim 8, wherein the means for deriving a sample of the modified signal is arranged to derive first and second samples of the modified signal, and the means for deriving a sample of the demodulated signal is arranged to derive corresponding first and second samples of the demodulated signal, the calculating means being arrange to derive a first correlation function for the first signal samples of the modified signal and the demodulated signal respectively, including means responsive to the first and second correlation functions for generating a control signal indicative of the frequency offset of the modulated carrier signal, and means for applying the frequency offset-indicative control signal to the oscillator means whereby the frequency of the signal generated thereby is adjusted substantially to maintain the predetermined relationship between the frequency of the signal generated by the oscillator means and the carrier signal.

10. A method for recovering the carrier signal from a digitally modulated carrier signal, including the steps of receiving the modulated carrier signal, processing the received carrier signal to output a modified signal, said processing step employing oscillator means for generating a signal nominally having a predetermining phase and frequency relationship relative to the carrier signal, demodulating said modified signal to generate a demodulated signal in the form of a sequence of digits corresponding to the carrier signal, deriving a sample of the modified signal, deriving a sample of the demodulated signal, calculating at least part of the correlation function of the modified signal sample and the demodulated signal sample, generating a control signal in accordance with information derived from the correlation function, and applying the control signal to the oscillator means whereby the phase of the signal generated by the oscillator means is adjusted in accordance with said control signal substantially to maintain the predetermined relationship between the phase of the signal generated by the oscillator means and the carrier signal.

11. A method as claimed in claim 10, including the steps of deriving first and second samples of the modified signal, deriving corresponding first and second samples of the demodulated signal, calculating a first correlation function for the first signal samples of the modified signal and the demodulated signal respectively and a second correlation function for the second signal samples of the modified signal and the demodulated signal respectively, comparing the first and second correlation functions to obtain frequency offset information, generating a control signal indicative of the frequency offset of the modulated carrier signal, and applying the frequency offset-indicative control signal to the oscillator means whereby the frequency of the signal generated thereby is adjusted substantially to maintain the predetermined relationship between the frequency of the signal generated by the oscillator means and the carrier signal.

* * * * *

UNITED STATES PATENT AND TRADEMARK OFFICE
CERTIFICATE OF CORRECTION

PATENT NO. : 5,081,652

DATED : January 14, 1992

INVENTOR(S) : Farahati et al.

It is certified that error appears in the above-identified patent and that said Letters Patent is hereby corrected as shown below:

Column 8, line 15, change "arrange" to --arranged--.
Column 8, line 32, change "predetermining" to --predetermined--.

Signed and Sealed this

Thirteenth Day of April, 1993

Attest:

STEPHEN G. KUNIN

*Attesting Officer*     Acting Commissioner of Patents and Trademarks